United States Patent [19]

Wiener et al.

[11] Patent Number: 4,492,026
[45] Date of Patent: Jan. 8, 1985

[54] CONDUCTOR SEPARATOR

[75] Inventors: Hans Wiener, Ingmarsö; Hans Undin, Åkersberga, both of Sweden

[73] Assignee: C. A. Weidmüller GmbH & Co., Detmold, Fed. Rep. of Germany

[21] Appl. No.: 421,404

[22] Filed: Sep. 22, 1982

[30] Foreign Application Priority Data

Mar. 15, 1982 [SE] Sweden ................. 8201600

[51] Int. Cl.³ ............................. B21F 13/00
[52] U.S. Cl. ........................ 30/90.9; 30/91.1; 83/500
[58] Field of Search .............. 30/90.1, 90.4, 90.8, 30/90.9, 91.1; 83/595, 596, 675, 502, 503, 332, 500, 664, 665

[56] References Cited

U.S. PATENT DOCUMENTS

| 3,082,523 | 3/1963 | Modes | 30/90.9 X |
| 3,279,058 | 10/1966 | Dibble | 30/90.8 |
| 3,543,616 | 12/1970 | Bradley | 30/90.9 X |
| 3,575,329 | 4/1971 | Hannabery | 83/500 |
| 3,771,398 | 11/1973 | Schaefer | 83/500 |
| 3,946,487 | 3/1976 | Bieganski | 30/90.9 |
| 4,265,016 | 5/1981 | Ducret | 30/90.4 |
| 4,275,630 | 6/1981 | Goldsmith | 83/675 |
| 4,380,256 | 4/1983 | Peterpaul | 30/90.8 |

Primary Examiner—Jimmy C. Peters
Attorney, Agent, or Firm—Toren, McGeady and Stanger

[57] ABSTRACT

Apparatus for separating individual conductor elements in a multiple-conductor flat ribbon cable including a rotatable cutting element for cutting the insulating sheathing of the cable along each of the score lines running between the individual conductor cores. The cutting element is provided with a plurality of protruding arcuate cutting edges each interrupted by a shorter indrawn non-cutting edge. Further provided is a cable support element adapted to press a cable inserted into the apparatus against the cutting edges, but not against the indrawn edges. When the indrawn edges face the cable support element, a feed-in and feed-out gap is provided for easy insertion and removal of the cable.

18 Claims, 11 Drawing Figures

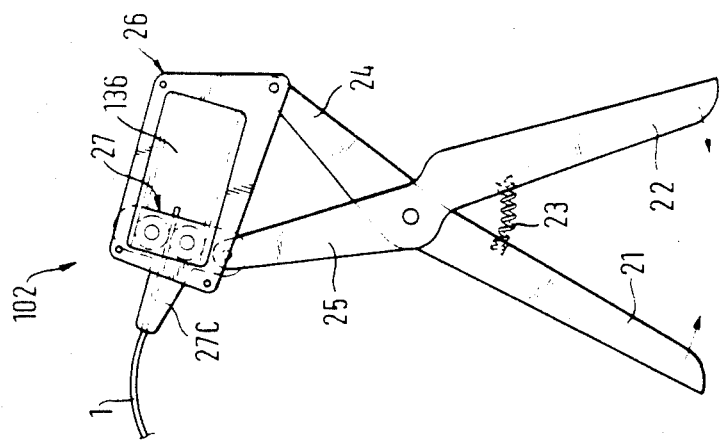
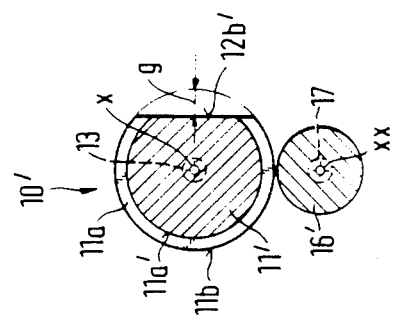
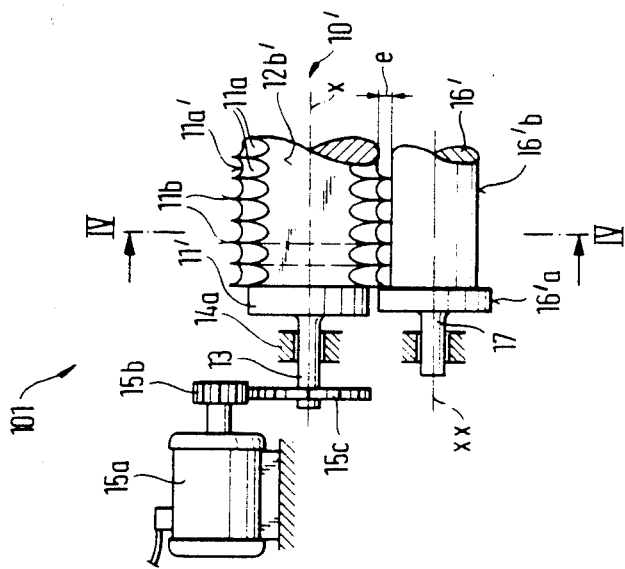

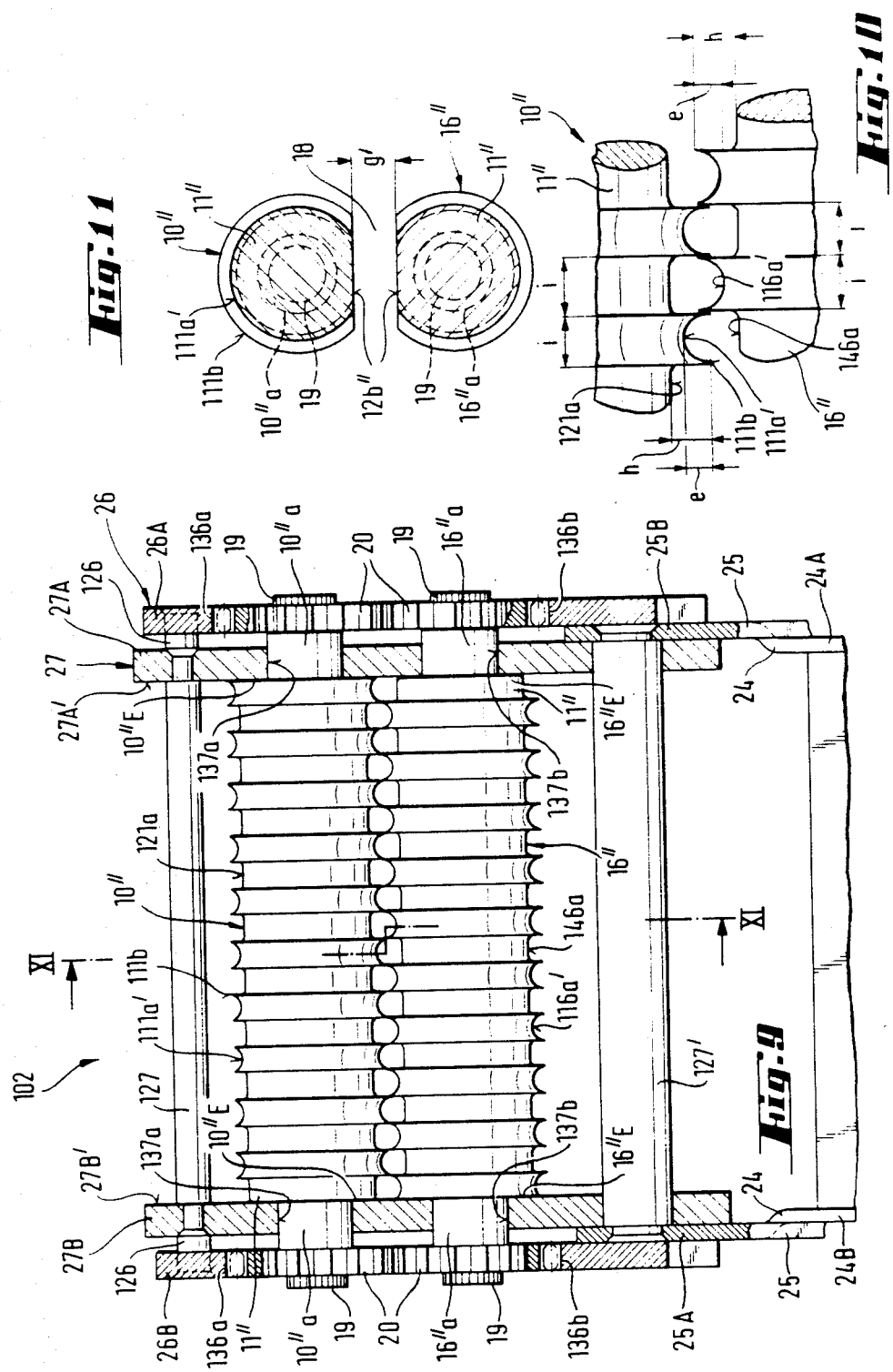

CONDUCTOR SEPARATOR

The present invention relates to apparatus for separating individual conductors in a multiple-conductor flat ribbon cable. A cable of this sort comprises a plurality of conductors or conductive cores disposed in side-by-side relationship and embedded in a common insulating sheathing. On both flat sides of the insulating sheathing run longitudinal score lines midway between every two adjacent embedded conductive cores, and the cable has greatest thickness at those portions of the sheathing which lie midway between two adjacent score lines, because the sheathing will bulge most over the part covering the embedded conductors.

To be able to connect the ends of the conductive cores of such a flat cable to appropriate connector means which generally are spaced apart a greater distance than the cores in the sheathing, it is necessary to separate the individual conductor elements of a flat ribbon cable, each such element consisting of a conductive core and a surrounding portion of the insulating sheathing, one from another.

An object of the invention is to provide an apparatus enabling a fast and simultaneous separation of all conductor elements in a flat ribbon cable in one single operation.

Another object of the present invention is to provide a hand-operated pliers-type tool embodying the apparatus.

Still another object of the present invention is to provide an apparatus enabling separation of the individual conductor elements of a flat ribbon cable along a predetermined length which is positioned at an arbitrary distance from the end of the cable and separated therefrom by a selected length of non-separated cable.

SUMMARY OF THE INVENTION

In accordance with the present invention, an apparatus for separating conductors in a multiple-conductor flat ribbon cable includes a cutting means for longitudinally cutting the sheathing along each score line. This cutting means is rotatable about an axis of rotation and is provided with a plurality, more precisely, an amount corresponding to the number of score lines in the broadest flat ribbon cable to be treated in the apparatus, of protruding cutting edge means spaced one from another by the same distance as the score lines on the cable sheathing are spaced one from another. Each cutting edge means has on its circumference a sharp cutting portion in the shape of a circular arc having its radius of curvature centered on said axis of rotation. This cutting portion extends only over less than a full circle, preferably at least 180°, and at most 340°, around the axis of rotation, and is at each of its two ends terminated by an end point. The two end points are further connected one to another by an indrawn, non-cutting (i.e., blunt) edge or area defining the remaining part of the periphery of the cutting edge means and possibly also a part of the surface of the body of the sheathing cutting means itself. By "indrawn" is meant that the periphery of the non-cutting section is at each point spaced less from the said axis of rotation than the length of the radius of curvature, i.e., that it extends entirely within an area delimited by a hypothetical prolongation beyond the end points of the circular arc defining the periphery of the cutting edge.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 5 is a front elevation of a terminal part of a second embodiment of the present invention;

FIG. 6 is a cross-section along the plane VI—VI in FIG. 5;

FIG. 7 is an overall view, on a smaller scale, of a third embodiment of the present invention in side elevation;

FIG. 9 is a cross-section along the plane IX—IX in FIG. 8;

FIG. 10 is an elevation, on a larger scale than FIG. 9, of a portion of an alternative embodiment of the two main parts shown in FIG. 9; and FIG. 11 is a cross-section along the plane XI—XI in FIG. 9 with the cutting and supporting means rotated through 90°.

DETAILED DESCRIPTION OF THE PREFERRED EMBODIMENTS

Figure 2:
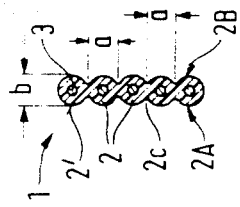
FIG. 2 is a cross-section along the plane II—II in FIG. 1.
Figure 1:
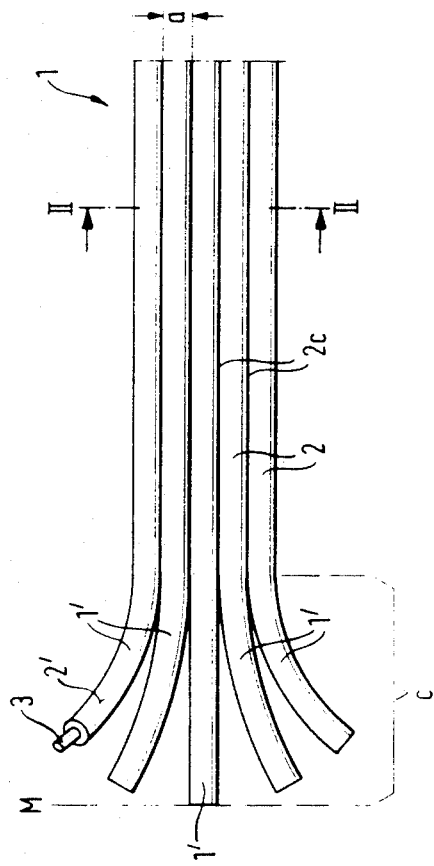
FIG. 1 is a plan view of a terminal portion of multiple-conductor flat ribbon cable.

Referring now to the drawings, wherein similar or analogous reference characters are used to refer to similar parts, there is shown in FIGS. 1 and 2, which do not depict inventive matter, a multiple-conductor flat ribbon cable 1 which includes an insulating sheathing 2 of rubber or plastic material and a plurality (five in this instance) of conductors or conductive cores 3 embedded in the sheathing 2. Midway between each pair of adjacent conductors 2 there appears at each flat side 2A, 2B of the sheathing 2 a longitudinal score line 2c running along the whole length of the cable 1. The mutual spacing of the score lines 2c is indicated as a in FIGS. 1 and 2. The cable 1 has its maximum thickness b midway between each two adjacent score lines 2c, because there the sheathing 2 maximally bulges over the embedded conductive cores 3, as will be readily recognized from FIG. 2.

To be able to connect the individual conductors 3 of a cable 1 to appropriate connectors (not shown), it is necessary to split the terminal portion of the cable 1 along a desired length c into separate conductor elements 1′, each comprising one conductive core 3 and a surrounding portion 2′ of the sheathing 2 which formerly was common to all conductive cores 3.

The hitherto described treatment of a multiple-conductor flat ribbon cable is conventional. To be able to connect a separated conductor element 1′ to a connector, it is further necessary to strip the insulation from its end portion. This can be done, conventionally as well as when applying the present invention, either individually, after the conductor elements have been separated, as is shown in FIG. 1 at the uppermost conductor element 1', or in common, before the individual conductor elements have been separated from, one another, e.g., with the aid of a stripping tool provided by the present inventors and described in German Offenlegungsschrift No. 31 34 312.

Figure 4:
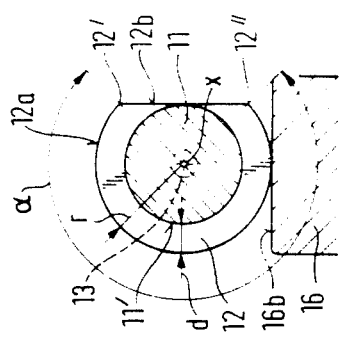
FIG. 4 is a cross-section along the plane IV—IV in FIG. 3.
Figure 3:
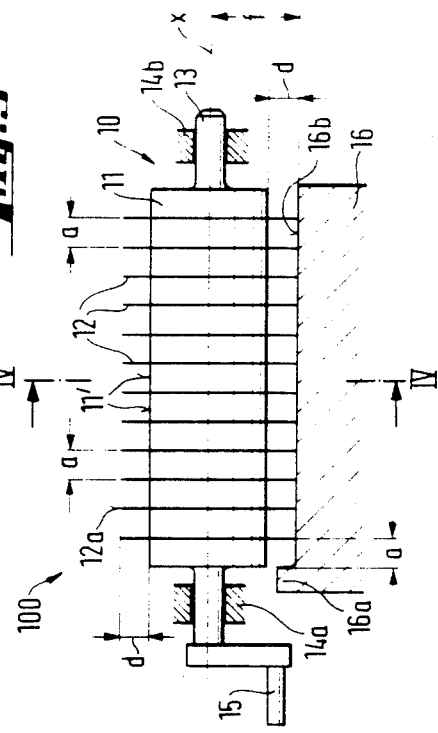
FIG. 3 is a front elevation of a first embodiment of the present invention.

According to FIGS. 3 and 4, there is provided in an apparatus 100 a rotatable sheathing cutting means 10 having a cylindrical body 11 and a plurality of protruding ribs 12 having sharp edges and defining cutting edge means. The body 11 is affixed to a shaft 13 which defines an axis of rotation x and which at 14a and 14b is rotatably mounted in a stand (not shown). A cranking handle 15, affixed to one end of the shaft 13, embodies a driving means of the apparatus.

A fixedly mounted plane support plate 16 with a highly polished upper surface 16b defines a cable support means and is located at a distance f from the axis x as to be tangential to the arcuate peripheries of the ribs 12. A projection 16a defines a side stop for a cable operationally inserted into the apparatus.

As will be recognized from FIG. 4, the ribs 12 have the shape of a ring which at one place is cut off tangentially to the cylindrical surface of the body 11. The circumference of each rib 12 is thus defined partly by a circular arc 12a extending between two end points 12', 12'' over an angle α of 270° in the example shown, where the circumference is formed as a sharp, cutting edge, and partly by a straight, non-cutting area portion 12b which at any place between the two end points 12', 12'' is spaced from the shaft 13 or axis x less than the length of the radius r of the arc 12a, i.e., is indrawn relative to said arc.

The ribs 12 protrude, where they are delimited by the arc 12a, above the immediately adjacent portions 11' of the body 11 by distance d which in the embodiment according to FIGS. 3 and 4 is somewhat greater than the distance b of FIG. 2. The first left hand rib 12 is spaced from the side stop 16a, and all the ribs 12 are spaced one from the other, by a distance a which is equivalent to that shown in FIG. 2.

In the operation of the apparatus, by activating cranking handle 15 the sheathing cutting means 10 is rotated into an initial position in which all the straight areas 12b face the support 16 and are parallel therewith. Thus, there is obtained a feed-in gap above the support plate 16 enabling easy introduction of a cable 1 into the apparatus, perpendicularly to the rotational axis x, and with one side edge abutting end stop 16a, because, as already stated, d>a.

The cranking handle 15 is then again activated so that body 11 turns clockwise in FIG. 4 (supposing the cable 1 has been fed in from the right hand side). End point 12' and the adjacent portion of the arcuate cutting edge 12a on each rib 12 engage cable 1 in one of the score lines 2c and the sheathing 2 is longitudinally cut through along each of the score lines because the arcuate edges 12a nearly touch the support plate 16. By the friction between the cutting edges 12a and the cut portions of the sheathing 2 the cable 1 is fed through the apparatus 100, gliding on the smooth upper surface 16b of the support plate 16.

When a full turn of the cranking handle 15 is completed, the straight edges 12b again face the support plate 16, the same gap between the support plate 16 and the body 11 is again obtained, this time as a feed-out gap, and the cable 1 may be readily withdrawn from the apparatus 100 by being pulled out in either direction. It will be appreciated that between the two end points 12' and 12'' also a non-straight blunt edge 12b can be provided, such as a concave edge, or an edge which is convex, but has an appreciably longer radius of curvature than the cutting edge 12a.

The length of the separated section c (FIG. 1) on the cable 1 corresponds obviously to the length of the arcuate cutting edge 12a. If before pulling out the cable 1, the operation is one or several times repeated, longer separated sections will be achieved.

It will be understood that, depending on how a terminal portion of a cable 1 is initially placed on the support plate 16, a more or less long unseparated section may be received at the end of the cable. Thus, a conveniently long unseparated end portion may be obtained for a following stripping operation on an undivided cable, if such a mode of stripping is preferred to stripping the individual conductor elements 1', despite the fact that an adjacent "inward" portion of the flat cable has been separated into individual conductor elements.

It will be appreciated in this connection that if, for some particular reason, it should be desired to separate the conductor elements of the a cable 1 other than at a terminal portion of the cable, i.e., other than at the very beginning M (FIG. 1), but at any other selected location spaced from the end, the cable 1 may be drawn through the feed-in gap to any desired length and separation along a selected distance c (by rotating the cranking handle 15 one or several times) may be obtained at any desired location along the entire length of the cable 1.

In FIGS. 5 and 6 there is shown an apparatus 101 having the same principal function as apparatus 100, but with a modified construction. A driving means comprises an electric motor 15a and toothed gears 15b, 15c through which shaft 13 is driven. The cylindrical body 11' of the sheathing cutting means 10' is provided at the surface with closely adjacent circumferential grooves 11a having an arcuate concave profile. The elevated borders or crests 11b of the grooves 11a define sharp cutting edges. In contrast to FIGS. 3 and 4, these cutting edges 11b protrude above the neighboring portions of the body 11', i.e., the lowermost portions 11a' of the concave profile, maximally by a distance e smaller than distance b in FIG. 2. Consequently, the portions of cable 1 which lie between the score lines 2c are also compressed, although not cut, between the sheathing cutting means 11' and the cable support means 16'. Thereby friction is increased and, as the cable support means in this instance is defined by a cylindrical body 16' which has a smooth surface 16'b and is mounted freely rotatable about an axis xx of a shaft 17, feeding of cable 1 through the apparatus is enhanced by the additional friction. Axes x and xx are parallel with one another. Cylindrical body 16' is at its one end provided with a protruding collar 16'a acting as a side stop.

In view of the relation e<b, the non-cutting area 12b' must, in accordance with FIG. 6, be positioned closer to axis x than the position at which it is tangential to the surface of body 11' (as was the case in FIGS. 3 and 4), otherwise a sufficiently wide feed-in and feed-out gap would not be obtained in the initial and final positions of the sheathing cutting means 10'. It will be appreciated from the study of FIG. 6 that the general condition for obtaining a satisfactory gap width in this embodiment is g>b.

The function of the apparatus according to FIGS. 5 and 6 is otherwise the same as described previously, with the modification that instead of manually operating a cranking handle 15, motor 15a is switched on for a desired number of full turns of shaft 13.

FIG. 7 is a side elevation of a pliers-type apparatus 102 according to the present invention, the main operative parts of which are shown in greater detail in FIGS. 8 to 11. The apparatus 102 comprises a pair of pivotably connected handles 21, 22 which are urged apart by a compression spring 23. Each handle has a shank member 24, 25 which at their free ends are moved towards or away from one another when the handles 21, 22 are brought together or separated by the return spring 23, respectively. Shank member 24 is at its free end pivotally connected to a cage means 26 in which is slidably arranged a frame means 27 which, in turn, is pivotally attached to the other shank member 25. A flat ribbon cable 1 is fed-in into the frame member 27 with the aid of a feed-in guiding member 27C.

Figure 8:
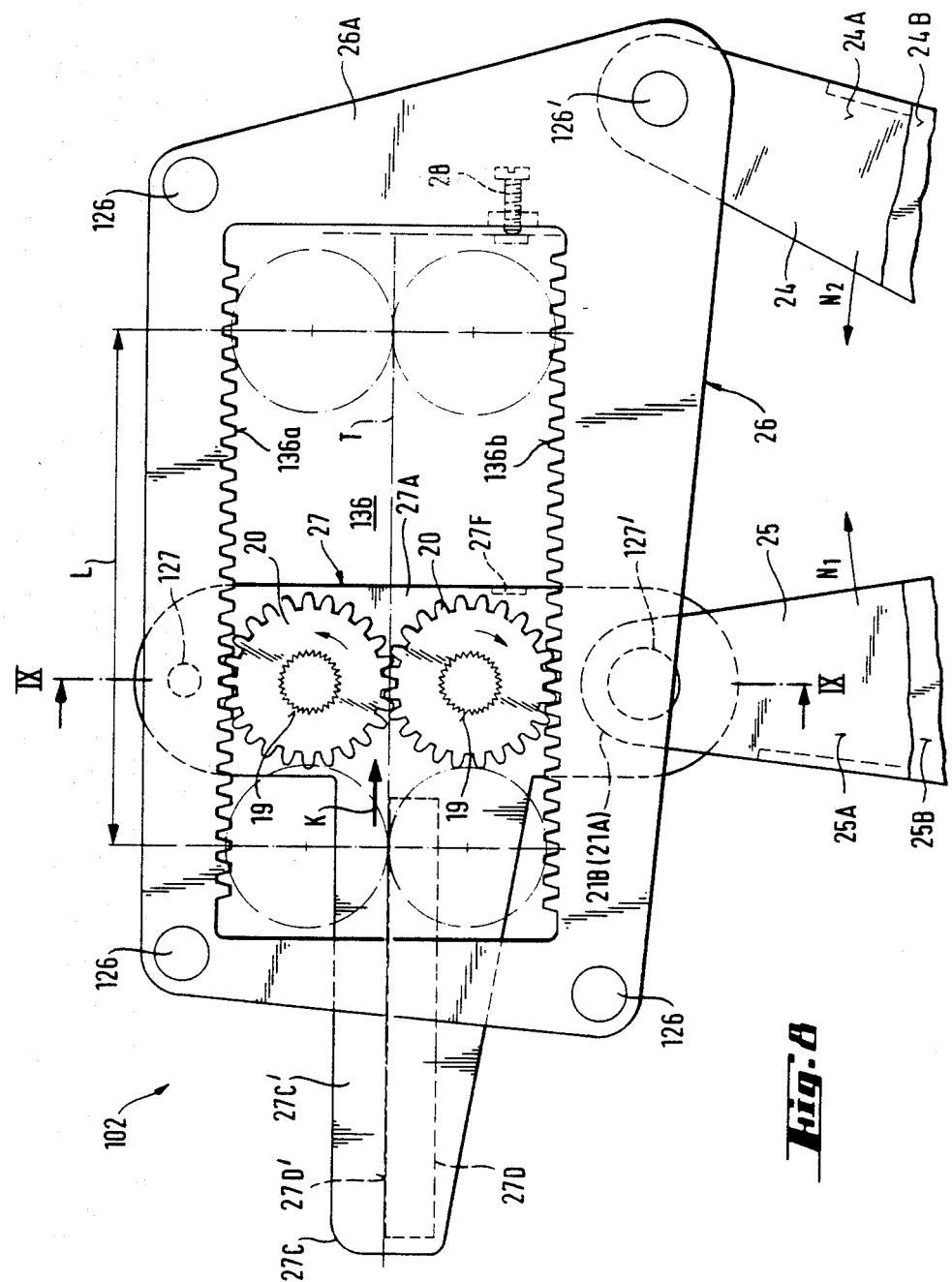
FIG. 8 is a side elevation, on a larger scale, of the operative portion of the embodiment according to FIG. 7.

As shown in FIGS. 8 and 9, the cage means 26 comprises two spaced apart side walls 26A, 26B connected with one another by those spacer bolts 126 and one spacer bolt 126' which at the same time acts as a pivot shaft for shank member 24. Shank member 24 comprises preferably two spaced apart side walls 24A, 24B, one adjacent each side wall 26A, 26B. Each of the side walls 26A, 26B is provided with a rectangular opening or window 136, the two opposed length sides of which are provided with parallel toothed racks 136a and 136b.

A frame means 27 is engaged in cage means 26 and comprises two side walls 27A, 27B connected together by a spacer bolt 127 and a spacer bolt 127' which at the same time acts as a pivot shaft relative to the shank member 25 which, in analogy to shank member 24, comprises two spaced apart side walls 25A, 25B. These side walls 25A, 25B are adjacent and interposed between the side walls 26A, 27A, and 26B, 27B. Mounting holes 137a, 137b in the side walls 27A, 27B operate with the aid of pivot shafts 10"a, 16"a, respectively, to rotatably mount an essentially cylindrical sheathing cutting means 10" and an essentially cylindrical cable support means 16".

On somewhat thinner terminal portions of the pivot shafts 10"a and 16"a there are affixed with the aid of splines 19 four identical toothed gears 20, each meshing with one of the adjacent racks 136a, 136b, and the adjacent gear 20.

The operational length L of the racks 136a, 136b corresponds at least to the length of the pitch circle of the gears 20 so that gears 20, when travelling along the racks, make a full 360° turn (or a whole number multiple of such full turns if L corresponds to a whole number multiple of such pitch circle). Preferably, the length of the racks 136a, 136b and of the windows 136 is selected so that exactly one full turn, or exactly a whole number multiple of full turns, is achieved. A settable end stop means, such as an adjustable screw 28 abutting with a strip 27F interconnecting the side walls 27A, 27B may be provided to exactly fix this relation.

The sheathing cutting means 10" and the cable support means 16" have identical shapes, which means that they comprise identical structural parts and are mounted in the frame means 27 in reversed position, as will be described in more detail hereinafter.

Means 10" and 16" each comprise a cylindrical body 11", 16" on the surface of which a plurality of circumferential grooves 111a', 116a' having an arcuate, concave cross-section are arranged. Grooves 111a', 116a' alternate with grooves 121a, 146a which have a flat bottom defined by the surface of body 11", 16" and which are provided in the same number as grooves 111a', 116a'. The lower point of the cross-section of grooves 111a', 116a' is raised by a distance h (FIG. 10) above the bottom of the grooves 121a, 146a, which bottom is defined by the level of the surface of body 11", 16". The crests 111b of the grooves 111a', 116a' define the cutting edge means. The depth e of the grooves 111a', 116a' is, as in FIG. 5, smaller than the thickness b shown in FIG. 2. Grooves of both types, i.e., those with concave cross-section and those with a straight bottom, have an essentially identical width i, so that the elevated concave-profile grooves on one of the means 10", 16" may penetrate into the flat-bottom grooves of the other means, as shown in FIG. 10. In any case, the cable 1 is strongly compressed between the means 10" and 16" alternately in the one and the other direction, and feeding of the cable through the apparatus 102, as well as cutting through the score lines are enhanced.

From the circumstance that grooves of both types are provided on each means 10", 16" in equal number, it follows that each means 10", 16" has at one end a groove of one type, and on the other end a groove of the other type. When the two means 10" and 16" are arranged in reversed relationship, as shown in FIG. 9, the elevated grooves on one interfit in the flat bottomed grooves of the other, and vice versa, and the end faces such as 10"E and 16"E are flush with one another and with a closely adjacent side wall face 27A' or 27B' of the frame means 27.

In the embodiment of FIGS. 7 to 11 there is virtually no difference between the sheathing cutting means and the cable support means, because both perform a cutting function and have identical structures. Therefore, it can be said that cable 1 is fed through between two identical, reversely mounted sheathing cutting means.

It will be readily recognized from FIG. 9 that the closely adjacent inner face 27B' of side wall 27B makes a special side stop means, such as ring 16'a in FIG. 5, unnecessary.

Both means 10", 16" also have identical non-cutting areas 12b". In FIG. 11, the means 10", 16" are shown in their initial position which is identical with their final position and in which areas 12b" face one another in parallel relationship so that a feed-in gap as well as a feed-out gap 18 is provided between both means 10" and 16". Gap 18 has a greater width g' than what the distance b is in FIG. 2.

It will be readily understood that one of the means 10" or 16" also may have cutting edges 111b extending over a full circle, i.e., 360°, provided that the other means has a sufficiently indrawn non-cutting area 12b" to achieve a gap 18 with a sufficient width g' (as is the case, e.g., in FIG. 6).

In principle, only one gear 20 at one end of each of the means 10", 16", and only one rack 136a or 136b are necessary. The rack drives the adjacent gear, and this in turn drives the meshing gear on the other means. Alternatively, each gear wheel may mesh with its own gear rack, but the gear wheels may not mesh with one another. However, from the study of FIGS. 8 and 9, it will be recognized that the circumstance that the gears 20 mesh with one another and each with one of the racks 136a, 136b stabilizes the relative position of the cage means 26 and of the frame means 27 so that neither means can tip around its pivot connection 126' or 127'.

The intermeshing parts 136a, 20, 20, and 136b thus constitute a means for stabilizing the relative position of the cage means 26 and the frame means 27, each of which are, as already stated, mounted pivotally on the shank members 24, 25. Providing racks and gear wheels at both ends of the means 10", 16" ensures smoother operation and prevents jamming.

When the apparatus 102 has to be assembled, frame means 27 is brought into one of its limit positions in cage means 26, and any two gears 20 are mounted on a respective pivot shaft 10"a or 16"a. Then both means 10", 16" are rotated into the initial (or final) position shown in FIG. 11. Thereafter, the two other gears 20 are mounted on the other pivot shaft and all four gears are axially affixed in some conventional manner. It will be appreciated that splines 19 enable gears 20 to be put on pivot shafts 10"a and 16"a in a great number of relative positions.

Protruding from each side wall 27A, 27B of the frame means 27 is an arm such as 27C' and affixed between both these arms is a support plate 27D, the upper face 27D' of which lies in a common tangential plane T to both means 10", 16", defining a guiding member.

In the operation of apparatus 102, spring 23 keeps apparatus 102 in the initial position with handles 21, 22 and shank members 24, 25 maximally apart and frame means 27 adjacent the left hand ends of the windows 136, as shown in FIG. 7. Means 10" and 16" are then also in their initial position which is shown in FIG. 11 and in which said feed-in gap 18 is provided. It will be appreciated that in distinction from FIG. 11, areas 12" also may have the location of edge 12b in FIG. 4, i.e., by tangential to the surface of the bodies 10" and 16" or to the bottom of the grooves 111a', 116a', because in the embodiment according to FIGS. 7-11, gap 18 is defined by the addition of the respective gaps on both means 10" and 16", and will therefore have a width g' greater than b, even if the gap on each means 10", 16" for itself would be smaller than b.

A cable 1 is introduced into the apparatus 102 along the upper face 27D' of guiding member 27C until the desired starting point for the separated section c lies between the means 10" and 16". As previously stated, this starting point may be the very beginning M of the cable 1 or any other selected location on this cable, rearwardly of M. Handles 21, 22 are then squeezed together by the operator as in a pair of conventional pliers, whereby the shank members 24, 25 are moved in the sense of arrows $N_1$, $N_2$ and frame means 27 is urged to travel relative to the cage means 26 in the sense of arrow K, until it strikes the opposite ends of the windows 136 or the stop means 28. By the racks 136a, 136b engaging with the gears 20, the means 10" and 16" are at the same time rotated a full turn and brought into their final position, which is identical with the initial one, and in which again gap 18 is provided. During and by this rotation of the means 10" and 16", cable 1 has been fed through between the means 10" and 16" and cut-through along each of its score lines 2c, and may now, by virtue of gap 18, be easily removed from the apparatus 102, whereupon the handles 21, 22 are released and spring 23 brings apparatus 102 back into the initial position.

The length c of the separated portion of cable 1 is substantially equal to the length of the arcuate cutting edge 12a and it may be made a whole-number-multiple thereof, if racks 136a and 136b are made appropriately longer or, as already described, the operation is repeated starting at the end point of the first separated length c.

It will be recognized from FIG. 9 that means 10" and 16" have in their portions turned toward one another a complementary profile. It will be readily understood that the apparatus also will be fully operational, although with somewhat greater frictional resistance, if the cable support means are embodied by a stationary part having such a complementary profile, e.g., the support plate 16 of FIG. 3 profiled at its upper face 16b complementarily to the profile of the cylindrical sheathing cutting means 10".

While specific embodiments of the invention have been shown and described in detail to illustrate the application of the inventive principles, it will be understood that the invention may be embodied otherwise without departing from such principles. For example, the relative movement of the frame means 26 and the cage means 27 in the embodiment according to FIG. 7, which is necessary for driving the gears 20, may be achieved when the free ends of the shank members 24, 25 move apart, provided frame means 27 is inserted into cage member 26 reversed, with guiding means 27C pointing to the right hand side.

What is claimed is:

1. Apparatus for separating conductors in a multiple-conductor flat ribbon cable having an insulating sheathing with longitudinal score lines between each pair of adjacent conductors embedded in the sheathing, said apparatus comprising, in combination:
    (a) means for longitudinally feeding said cable through the apparatus and for cutting said sheathing thereof along each said score line, said means being rotatable about an axis of rotation which is perpendicular to the length direction of said cable when inserted into the apparatus, said means being provided with a plurality of protruding cutting edge means spaced one from another by the same distance as said score lines on the sheathing are spaced one from another, each cutting edge means having an arcuate operational edge section with the circumferential shape of a circular arc having its radius of curvature centered on said axis of rotation and extending over less than a full circle between two end points, the remaining part of the periphery of the cutting edge means between the said two end points being defined by an indrawn, non-cutting edge section which at each point thereon is spaced from said axis of rotation less than the length of said radius;
    (b) cable support means adjacent said sheathing cutting means having a smooth surface devoid of cutting edge means and adapted to press a flat ribbon cable inserted into the apparatus against said arcuate operational edge sections of the cutting edge means in order to effect feeding of said cable and cutting of said sheathing and to relieve said cable from said non-cutting edge sections and providing in cooperation with said indrawn non-cutting sections a feed-in and feed-out gap having a width greater than a maximum thickness of said cable; and
    (c) drive means for rotating said sheathing cutting means at least one full turn.

2. Apparatus according to claim 1 wherein said arcuate operational edge sections extend over a range of 180° to 340°.

3. Apparatus according to claim 1 wherein said drive means operate to drive said rotatable support means as well as said sheathing cutting means.

4. Apparatus according to claim 1 wherein said cable support means at least in a portion thereof which is turned toward said sheathing cutting means has a profile which is complementary to the profile of said sheathing cutting means.

5. Apparatus according to claim 1 wherein said sheathing cutting means is operable to perform, starting from an initial position, exactly one full turn or a whole-number-multiple of full turns.

6. A pliers-type hand-operated apparatus for separating conductors in a multiple-conductor flat ribbon cable having an insulating sheathing with longitudinal score lines between each pair of adjacent conductors embedded in the sheating, said apparatus comprising, in combination:
   (a) a pair of pivotally connected operating handles;
   (b) a pair of shank members drivably connected to said handles and movable toward and apart from one another;
   (c) cage means having two spaced apart side wall means parallel with one another, said cage means being pivotally attached to one of said shank members;
   (d) frame means pivotally attached to the other of said shank members slidably mounted in said cage means;
   (e) two rotatable sheathing cutting means mounted in parallel relationship in said frame means and each provided at at least one of its ends with a gear wheel and along its length with a plurality of cutting edge means having the circumferential shape of a circular arc and spaced from one another by the same distance as the score lines on the sheathing are spaced one from the other, said cutting means on at least one of said sheathing cutting means extending over less than 360° and being complemented by indrawn non-cutting peripheral sections dimensioned so that in an initial position of the sheathing cutting means a feed-in gap is provided between said two sheathing cutting means which is wider than the maximum thickness of a cable to be treated in the apparatus; and
   (f) at least one gear rack means provided on at least one of said side wall means for engagement with at least one of said gear wheels, the other of said gear wheels meshing with at least one of the first said gear wheel and another gear rack means.

7. Apparatus according to claim 6 wherein in at least one of said side wall means there is provided a rectangular opening and wherein at least one length side of this opening defines said gear rack means.

8. Apparatus according to claim 6 wherein for the stabilization of the relative position of the edge means and of the frame means, there are on at least one of said side wall means provided two gear rack means each meshing with the gear wheel of another one of the two sheathing cutting means, with said two gear wheels also meshing with one another.

9. Apparatus according to claim 6 wherein a feed-in guiding member for the flat ribbon cable is provided at said frame means.

10. Apparatus according to claim 6 wherein the two sheathing cutting means comprise identical structural parts and are mounted in the frame means in reversed position.

11. Apparatus according to claim 6 wherein the operational length of the gear rack means is selected to correspond exactly to a whole number multiple of rotations of the meshing gear wheel.

12. Apparatus for separating conductors in a multiple-conductor flat ribbon cable having an insulating sheathing with longitudinal score lines between each pair of adjacent conductors embedded in said sheathing, said apparatus comprising, in combination:
   means for longitudinally feeding said cable through said apparatus and for cutting said sheathing thereof along each of said score lines, said cutting means being rotatable about an axis of rotation which is perpendicular to the length direction of said cable when inserted into said apparatus, said cutting means being provided with a plurality of protruding cutting edges spaced one from another by the same distance as said score lines on said sheathing are spaced one from another, each of said cutting edges having the circumferential shape of a circular arc having its radius of curvature centered on said axis of rotation and extending over less than a full circle between two end points, with the remaining part of the periphery of each of said cutting means between said two end points being defined by an indrawn, non-cutting section which at each point thereon is spaced from said axis of rotation less than the length of said radius;
   cable support means adjacent said sheathing cutting means and adapted to press a flat ribbon cable inserted into said apparatus against said cutting edges of said cutting means and to relieve said cable from said non-cutting sections and provided in cooperation with said indrawn, non-cutting sections a feed-in and feed-out gap having a width greater than the maximum thickness of said cable; and
   drive means for rotating said sheathing cutting means at least one full turn;
   said cutting edges protruding from immediately adjacent portions of said sheathing cutting means less than the maximum thickness of an inserted flat ribbon cable, said cable being thereby compressed between said adjacent portions and said cable support means for better transport through said appratus.

13. Apparatus for separating conductors in a multiple-conductor flat ribbon cable having an insulating sheathing with longitudinal score lines between each pair of adjacent conductors embedded in said sheathing, said apparatus comprising, in combination:
   means for longitudinally feeding said cable through said apparatus and for cutting said sheathing thereof along each of said score lines, said cutting means being rotatable about an axis of rotation which is perpendicular to the length direction of said cable when inserted into said apparatus, said cutting means being provided with a plurality of protruding cutting edges spaced one from another by the same distance as said score lines on said sheathing are spaced one from another, each of said cutting edges having the circumferential shape of a circular arc having its radius of curvature centered on said axis of rotation and extending over less than a full circle between two end points, with the remaining part of the periphery of each of said cutting means between said two end points being defined by an indrawn, non-cutting section which at each point thereon is spaced from said axis of rotation less than the length of said radius;

cable support means adjacent said sheathing cutting means and adapted to press a flat ribbon cable inserted into said apparatus against said cutting edges of said cutting means and to relieve said cable from said non-cutting sections and provided in cooperation with said indrawn, non-cutting sections a feed-in and feed-out gap having a width greater than the maximum thickness of said cable; and drive means for rotating said sheathing means at least one full turn;

said cutting edges protruding from immediately adjacent portions of said sheathing cutting means less than the maximum thickness of an inserted flat ribbon cable, said cable being thereby compressed between said adjacent portions and said cable support means for better transport through said apparatus;

said cable support means being generally cylindrical in shape and rotatable about an axis parallel with the axis of rotation of said sheathing cutting means.

14. Apparatus for separating conductors in a multiple-conductor flat ribbon cable having an insulating sheathing with longitudinal scroe lines between each pair of adjacent conductors embedded in said sheathing, said apparatus comprising, in combination:

means for longitudinally feeding said cable through said apparatus and for cutting said sheathing thereof along each of said score lines, said cutting means being rotatable about an axis of rotation which is perpendicular to the length direction of said cable when inserted into said apparatus, said cutting means being provided with a plurality of protruding cutting edges spaced one from another by the same distance as said score lines on said sheathing are spaced one from another, each of said cutting edges having the circumferential shape of a circular arc having its radius of curvature centered on said axis of rotation and extending over less than a full circle between two end points, with the remaining part of the periphery of each of said cutting means between said two end points being defined by an indrawn, non-cutting section which at each point thereon is spaced from said axis of rotation less than the length of said radius;

cable support means adjacent said sheathing cutting means and adapted to press a flat ribbon cable inserted into said apparatus against said cutting edges of said cutting means and to relieve said cable from said non-cutting sections and provided in cooperation with said indrawn, non-cutting sections a feed-in and feed-out gap having a width greater than the maximum thickness of said cable; and drive means for rotating said sheathing cutting means at least one full turn;

said cutting edges being arranged in neighboring pairs with each pair of neighboring cutting edges being defined by crest portions of a circumferential groove with a concave arcuate profile of given depth, said circumferential concave profile grooves alternating with circumferential grooves having a greater depth than said given depth;

said cable support means having an identical configuration as said sheathing cutting means with both being rotatable and driven by said drive means, the arrangement being such that portions of each of said cable support means and sheathing cutting means bearing said concavely arcuate grooves penetrate into said deeper circumferential grooves in the other.

15. Apparatus for separating conductors in a multiple-conductor flat ribbon cable having an insulating sheathing with longitudinal score lines between each pair of adjacent conductors embedded in said sheathing, said apparatus comprising, in combination:

means for longitudinally feeding said cable through said apparatus and for cutting said sheathing thereof along each of said score lines, said cutting means being rotatable about an axis of rotation which is perpendicular to the length direction of said cable when inserted into said apparatus, said cutting means being provided with a plurality of protruding cutting edges spaced one from another by the same distance as said score lines on said sheathing are spaced one from another, each of said cutting edges having the circumferential shape of a circular arc having its radius of curvature centered on said axis of rotation and extending over less than a full circle between two end points, with the remaining part of the periphery of each of said cutting means between said two end points being defined by an indrawn, non-cutting section which at each point thereon is spaced from said axis of rotation less than the length of said radius; cable support means adjacent said sheathing cutting means and adapted to press a flat ribbon cable inserted into said apparatus against said cutting edges of said cutting means and to relieve said cable from said non-cutting sections and provided in cooperation with said indrawn, non-cutting sections a feed-in and feed-out gap having a width greater than the maximum thickness of said cable; and drive means for rotating said sheathing cutting means at least one full turn;

said sheathing cutting means and said cable support means being mounted in frame means, wherein said sheathing cutting means is at least at one of its ends provided with a gear wheel, and wherein said frame means is slidably mounted in cage means having spaced apart side walls provided with at least one gear rack meshing with said at least one gear wheel for driving said sheathing cutting means when relative movement between said frame means and said cage means occurs.

16. Apparatus according to claim 15 wherein said cable support means is rotatable and at least at one of its ends provided with a gear wheel meshing with at least one of said gear rack or said gear wheel.

17. Apparatus according to claim 16 wherein said driving means comprises a pair of pivotally connected operating handles and a pair of shank members drivable by said handles in an approaching and a distancing movement, said cage means being attached to one, and said frame means to the other of said shank members.

18. Apparatus according to claim 15 wherein said driving means comprises a pair of pivotally connected operating handles and a pair of shank members drivable by said handles and movable toward and apart from each other, said cage means being attached to one, and said frame means to the other of said shank members.

* * * * *